United States Patent [19]

Koto

[11] 4,368,478

[45] Jan. 11, 1983

[54] INK SUPPLY SYSTEM FOR INK JET PRINTERS

[75] Inventor: Haruhiko Koto, Shiojiri, Japan

[73] Assignees: Shinshu Seiki Kabushiki Kaisha, Nagano; Kabushiki Kaisha Suwa Seikosha, Tokyo, both of Japan

[21] Appl. No.: 270,680

[22] Filed: Jun. 4, 1981

[30] Foreign Application Priority Data

Jun. 6, 1980 [JP] Japan .................................. 55/76257
Jun. 6, 1980 [JP] Japan .................................. 55/76258

[51] Int. Cl.³ .............................................. G01D 15/18
[52] U.S. Cl. ................................................ 346/140 R
[58] Field of Search ............................ 346/140 R, 75; 73/861.41; 128/DIG. 13, 214 E; 340/606, 603

[56] References Cited

U.S. PATENT DOCUMENTS

| | | | |
|---|---|---|---|
| 3,403,554 | 10/1968 | Chevalier | 73/861.41 |
| 3,708,798 | 1/1973 | Hildenbrand | 346/140 |
| 3,898,637 | 8/1975 | Wolstenholme | 340/606 |
| 3,974,508 | 8/1976 | Blumenthal | 346/140 |
| 4,149,172 | 4/1979 | Heinzl | 346/140 |
| 4,153,902 | 5/1979 | Kanayama | 346/140 |
| 4,183,029 | 1/1980 | Isayama | 346/140 |
| 4,183,031 | 1/1980 | Kyser | 346/140 |
| 4,202,267 | 5/1980 | Heinzl | 101/364 |
| 4,301,459 | 11/1981 | Isayama | 346/140 |
| 4,306,245 | 12/1981 | Kasugayama | 346/140 |

FOREIGN PATENT DOCUMENTS

| | | | |
|---|---|---|---|
| 139533 | 10/1979 | Japan | 346/140 |

*Primary Examiner*—Joseph W. Hartary
*Attorney, Agent, or Firm*—Blum, Kaplan, Friedman, Silberman & Beran

[57] ABSTRACT

An ink supply system for an ink printer. The system includes an ink cartridge which supplies ink through a conduit to the print head of the printer. A bubble trapping device is disposed along the conduit and includes a porous member which prevents air bubbles from entering the nozzle of the print head. The air bubbles are held in a chamber defined in the bubble trapping device. Fluid passages in the chamber of the bubble trapping device allow for continuous feeding of the ink to the porous member for passage to the nozzle. A bubble detecting device may also be provided in the supply system.

45 Claims, 17 Drawing Figures

FIG. 1
PRIOR ART
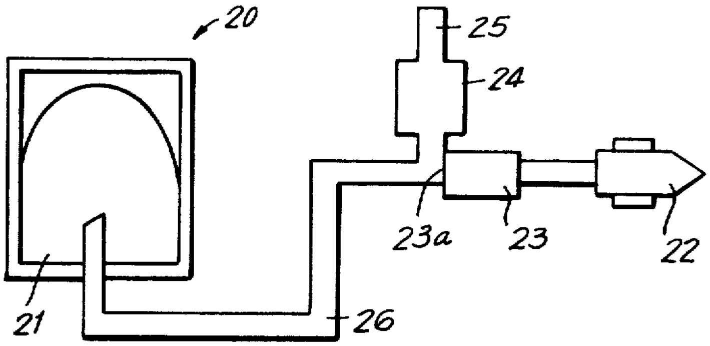
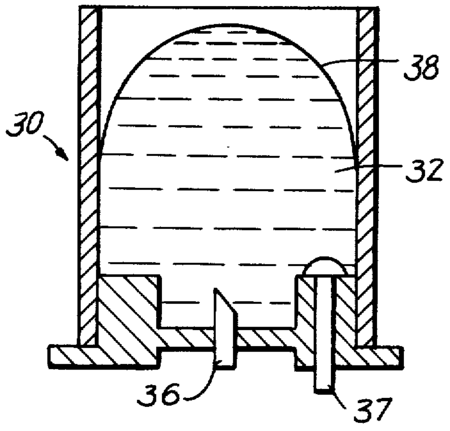
FIG. 2
PRIOR ART

FIG. 9A
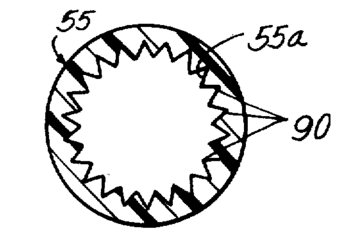
FIG. 9B
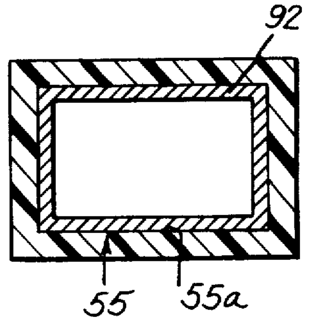
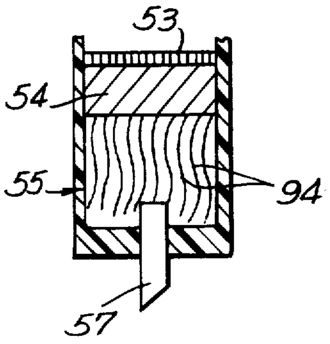
FIG. 9C
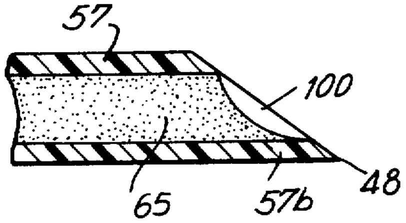
FIG. 10

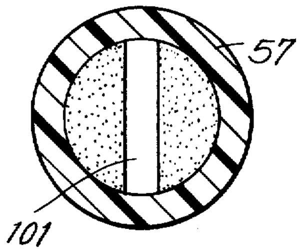
FIG. 11A
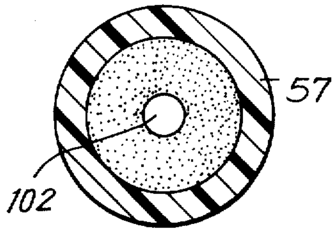
FIG. 11B
FIG. 11C
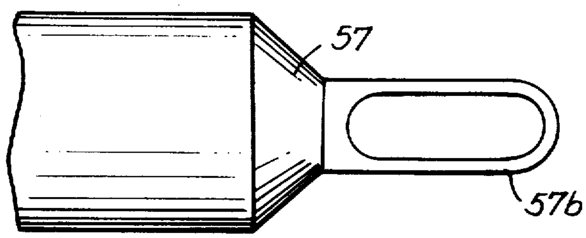
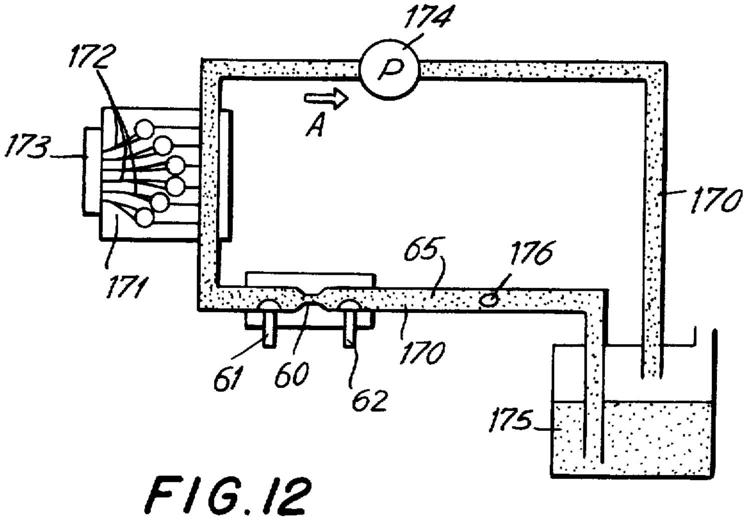
FIG. 12

INK SUPPLY SYSTEM FOR INK JET PRINTERS

BACKGROUND OF THE INVENTION

This invention is directed to an ink supply system for ink jet printers and, in particular, to an ink supply system for supplying ink to the nozzle of an ink jet printer which can both monitor the consumption of ink and detect and trap air bubbles in the printer.

The ink-on-demand type ink jet printing apparatus which selectively projects ink droplets from a nozzle to effect printing on a recording medium by reducing the volume of a pressure chamber is advantageous in that such an apparatus can print on plain paper. Additionally, in ink jet printers, the printing noise is low and the apparatus requires low energy to operate. However, a major problem with ink jet printers is that it becomes difficult to project the droplets of ink if an air bubble or other obstruction is present in the pressure chamber which inhibits the flow of ink to the head or nozzle thereby interrupting the clear printing operation. Such air bubbles can form in the ink supply container and can flow into the print head. Also, air bubbles may form in the print head and flow back through the nozzle into the supply line. Thus, it becomes critical in ink jet printers to eliminate and prevent air bubbles from interrupting the printing operation.

One type of ink supply system for an ink jet printer which traps and releases air bubbles is described in U.S. Pat. No. 4,149,172 entitled INK SUPPLY SYSTEM FOR PIEZOELECTRICALLY OPERATED PRINTING JETS. The ink supply system described in U.S. Pat. No. 4,149,172 can only be operated in an upright position and is therefore not practical for use in small-sized portable printers such as electronic calculators, for example, where printing may occur in positions other than an upright position.

It is also advantageous for the ink supply system to have a means for detecting when the ink supply has been exhausted so that it can be replaced or refilled. A device which detects the amount of ink in the ink supply container or bag of an ink-operated printer is described in U.S. Pat. No. 4,202,267 entitled DEVICE FOR MONITORING THE INK SUPPLY IN INK-OPERATED PRINTERS. The device described in U.S. Pat. No. 4,202,267 merely detects when the ink supply is low and does not detect the presence of air bubbles in the ink flow line. Moreover, this device cannot be used in portable printers such as portable hand-held calculators since the device must be operated in an upright position. Accordingly, an ink supply system for an ink jet printer which prevents air bubbles from interrupting the printing operation and which can be incorporated into portable printing devices such as hand-held calculators, is desired.

SUMMARY OF THE INVENTION

Generally speaking, in accordance with the instant invention, an ink supply system for ink jet printers which can be used in portable printers such as hand-held calculators or the like and which prevents air bubbles from interrupting the printing operation of the ink jet printer, is provided.

The ink supply system of the present invention is adapted for use with an ink jet printer including a print head having at least one ink jet nozzle for selectively projecting ink onto a recording medium to effect the printing of characters and symbols thereon. The system includes a replaceable ink cartridge having a supply of liquid ink and a conduit which connects the ink cartridge to the nozzle in the print head through which the ink is supplied to the nozzle. An air trapping chamber is disposed along the conduit, preferably proximate the nozzle of the print head, to trap air bubbles which would otherwise interrupt the printing operation by preventing the smooth flow of ink to the ink jet nozzle. The air trapping chamber includes a porous member which blocks air bubbles from reaching the nozzle. The air bubbles are collected in the chamber. The chamber includes fluid passage channels through which the ink can flow to the print head while the air bubbles remain trapped.

The ink supply system may also include an ink supply and bubble detector along the conduit. In this instance, two electrodes are spaced in a capillary tube formed in the conduit between the nozzle and the ink supply cartridge. An air bubble in the capillary tube will break the electrical resistive connection between the spaced electrodes normally created by the presence of ink, which will indicate to an operator that an air bubble exists in the conduit or that the ink supply is exhausted.

The ink supply system of the present invention is designed to operate in any orientation so that it can be used in portable devices having an ink jet printer such as a hand-held portable calculators or the like. The system can be constructed so that the ink cartridge is readily disposable and easily replacable. The ink cartridge may include the bubble detector with the spaced electrodes in the capillary tube forming a part thereof. The air trapping chamber can be formed as part of the print head of the ink jet printer.

Accordingly, it is an object of the present invention to provide an improved ink supply system for ink jet printers.

Another object of the invention is to provide an ink supply system for ink jet printers which traps air bubbles and prevents the interruption of the printing operation.

A furhter object of the invention is to provide an ink supply system for an ink jet printer which includes a bubble detecting device which detects the presence of bubbles in the ink supply line.

A still further object of the instant invention is to provide an ink jet printer for use with portable devices such as hand-held calculators and the like.

Yet another object of the instant invention is to provide an ink supply system for an ink jet printer which includes an air trapping chamber and an air bubble detector which can be used in portable devices.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic diagram of an ink supply system constructed in accordance with the prior art;

FIG. 2 is a sectional schematic view of an ink supply container constructed in accordance with the prior art;

FIGS. 9A and 9B depict alternative constructions of the air trapping chamber depicted in FIG. 5;

FIG. 9C is an alternative embodiment of the air trapping chamber depicted in FIG. 3;

FIG. 10 is a fragmentary sectional view of the connector depicted in FIG. 3;

FIGS. 11A and 11B are end views of alternative embodiments of the connector depicted in FIG. 10;

FIG. 11C is a side view of an alternative construction of the connector depicted in FIG. 10; and FIG. 12 is a schematic diagram of an alternative embodiment of the ink supply system of the present invention.

DESCRIPTION OF THE PREFERRED EMBODIMENTS

Figure 3:
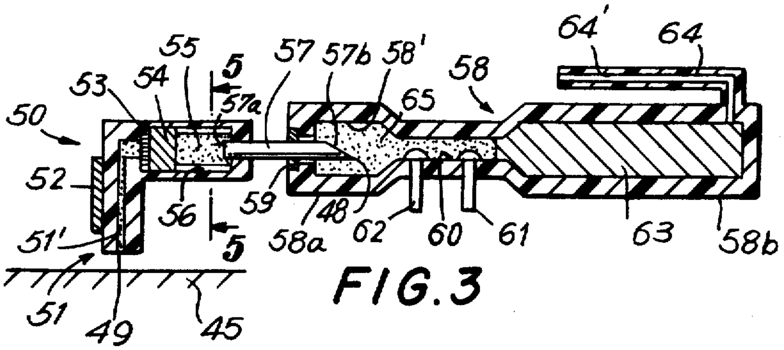
FIG. 3 is a sectional schematic view of an ink supply system constructed in accordance with the present invention.

Reference is first made to FIG. 1 wherein an ink supply system, generally indicated as 20, for use with an ink jet printer and constructed in accordance with the prior art, is depicted. The system depicted in FIG. 1 is described in U.S. Pat. No. 4,149,172 entitled INK SUPPLY SYSTEM FOR PIEZOELECTRICALLY OPERATED PRINTING JETS. The system is intended to release air bubbles formed or found in the ink conduit which would otherwise inhibit the printing operation.

In FIG. 1, a capillary filter 23, such as a ceramic filter, is disposed in an ink passage 26 providing communication between an ink tank 21 and a print head 22 so that an air bubble present in passage 26 is trapped by capillary filter 23. The trapped air bubble is collected in an air trap 24 and is eventually discharged to the atmosphere through an air vent 25. In the construction depicted in FIG. 1, however, the vertical orientation between capillary filter 23 and air trap 24 is required which makes it difficult, if not impossible, to apply this device to a printer for use with a small-size portable electronic calculator, for example, in which the printing operation can be performed in other positions when hand-held.

For example, if the printing operation is performed upside down in FIG. 1 so that the entire mechanism is upside down, the air in air trap 24 will flow back to the front face 23*a* of capillary filter 23 until it either passes through capillary filter 23 to reach print head 22 or until the supply of ink from ink tank 21 through ink passage 26 is interrupted, thus making it impossible to perform the printing operation in either event. The air bubble will prevent the ink from flowing from tank 21 to print head jet nozzle 22, thereby interrupting the printing operation.

Referring now to FIG. 2, a system for detecting the consumption of ink in an ink jet printer, also constructed in accordance with the prior art, will be described. The device depicted in FIG. 2 is more fully described in U.S. Pat. No. 4,202,267 entitled DEVICE FOR MONITORING THE INK SUPPLY IN INK-OPERATED PRINTERS. An ink tank, generally indicated as 30, replaces ink tank 21 depicted in FIG. 1. A rubber bag 38 holds ink 32 which is supplied through a needle connector 36 to the print head nozzle 22 depicted in FIG. 1.

In the case where the supply of ink 32 has been exhausted, air in ink tank 30 will flow through needle 36 into print head 22. Alternatively, air may flow back from the nozzle of print head 22 into conduit 26 thus interrupting the printing operation. Even if, in this case, ink tank 30 is replaced, the printing operation cannot be restarted unless the bubble in the print head is discharged. In the tank depicted in FIG. 2, the shortage of ink 32 is detected before air is introduced into the print head, and indicates to an operator that ink tank 30 must be replaced.

More specifically, needle 36 is utilized as an electrode together with an electrode 37, both being mounted on the bottom of ink tank 30 in spaced relation. Rubber ink bag 38 reduces the quantity of ink 32 between electrodes 36 and 37 in accordance with ink consumption, so that the change in the electric resistance between electrodes 36 and 37 at low ink levels is detected. In this construction, however, a layer of the ink connecting electrodes 36 and 37 will always exist, no matter how closely rubber bag 38 comes into contact with electrode 37 so that the change in the resistance between the detection under a normal condition and the detection after the ink has been consumed is so small as to make it difficult to insure reliable detection of ink consumption. Moreover, the ink tank depicted in FIG. 2 is absolutely ineffective for preventing or detecting air bubbles from slipping into the printing head other than when the ink is used up which will be detected by a detection circuit coupled between electrodes 36 and 37. Additionally, ink tank 30 must operate in an upright position as depicted in FIG. 2. Otherwise, the connection between electrodes 36 and 37 by ink 32 will be broken and the detection circuit will be triggered. Also, when not upright the ink will not flow through needle 36.

In the prior art ink supply systems described above with reference to FIGS. 1 and 2, it has been difficult to apply the ink-on-demand ink jet to a printer for small-size portable electronic calculators, which are required to perform the printing operation at any given position, because of the necessity of keeping the devices depicted in FIGS. 1 and 2 in an upright position and the unreliability of detection of ink consumption. The present invention provides an ink supply system which can be applied to such a small-size portable type printer which can perform the printing operation at any position or orientation and which can prevent air bubbles from leaking into the ink-on-demand type print head without fail.

Reference is now made to FIG. 3 in order to describe in detail the ink supply system, generally indicated at 50, constructed in accordance with the present invention. A print head 51 which is injection molded from plastic includes an ink jet nozzle 49 which selectively projects ink onto a recording medium 45 such as plain paper through a bore 51'. A piezoelectric element 52 is secured to print head 51 for providing energy for ink projection through nozzle 49 by creating a vacuum-type pumping action for the ink. A filter 53 is provided in print head 51 which prevents dust from entering and clogging nozzle 49.

Figure 5:
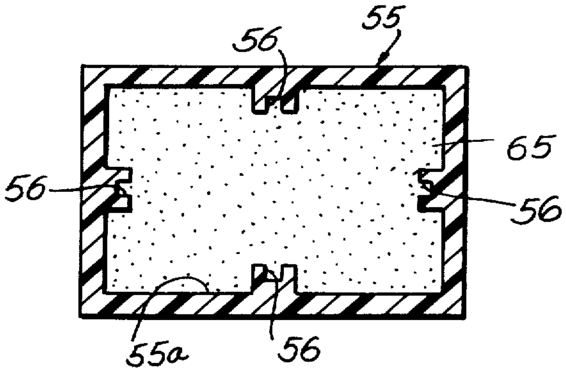
FIG. 5 is an enlarged sectional view taken along line 5—5 of FIG. 3.

A porous member 54 is disposed adjacent filter 53. Porous member 54 is preferably made of a resin material having an excellent wetting property with the ink, for example, a polyvinyl formal resin. An air trapping chamber 55 is disposed intermediate porous member 54 and a connecting member 57 in the path of flow of ink 65. Air trapping chamber 55 includes ink guide passages 56 (FIG. 5). Connecting member 57 is coupled at a first end 57*a* thereof to print head 51. Connecting member 57 is constructed from a hollow needle preferrably made of stainless steel having a sharp piercing point 48 at end 57*b* thereof. An ink conduit is defined through needle 57, air trapping chamber 55, porous member 54, filter 53 and bore 51' in nozzle 49.

An ink cartridge 58 includes a first end 58*a* having a rubber plug 59 through which point 48 of needle 57 extends. Cartridge 58 includes a capillary tube 60 having two electrodes 61 and 62 spaced therein. As depicted in FIG. 3, electrodes 61 and 62 are in the form of rivets. Cartridge 58 includes a porous member 63 at the second end 58*b* thereof. Porous member 63 is made of a material having the same quality as that of porous member 54 in print head 51. An air inlet 64 is coupled to second end 58*b* of cartridge 58 and includes an inner passage 64' through which air can pass. An ink conduit in cartridge 58 continuous with the ink conduit described above in print head 51 through needle 57 is defined by porous member 63, capillary tube 60 and a reservoir 58' in which point 48 extends. In a normal operating condition, the ink feed conduit leading from porous member 63 to printing head 51 is filled up with ink 65.

The operation of ink feed system 50 will now be described. Print head 51 is caused to perform relative motion to recording paper 45 by means of a drive mechanism (not shown) in order to selectively effect printing thereon. Piezoelectric element 52 is driven by a control circuit (not shown) in order to selectively project ink 65 from nozzle 49 onto paper 45. As the printing operation proceeds, the ink in porous member 63 gradually flows through connector 57 to print head 51 in order to feed nozzle 49 with ink.

Due to the vacuum created by the vibration of piezoelectric element 52 when the ink jet printer is operating, air is pulled through air inlet 64 into ink cartridge 58. In normal operation, the printing operation continues with the ink being selectively pulled by means of piezoelectric element 52 from porous member 63 to nozzle 49. If an air bubble in porous member 63 is caused to flow toward print head 51 along the ink conduit, either due to the ink being pulled therefrom or by some other cause, when the bubble reaches capillary tube 60, the resistance between electrodes 61 and 62 becomes infinite. If this change in resistance is detected through a detecting circuit (not shown) coupled between electrode 61 and 62, it is possible to warn an operator about the presence of the bubble and to prevent the bubble from flowing into print head 51 which would otherwise interrupt the printing operation. This construction also provides an indication of the exhaustion of the ink in porous member 63.

Figure 4:
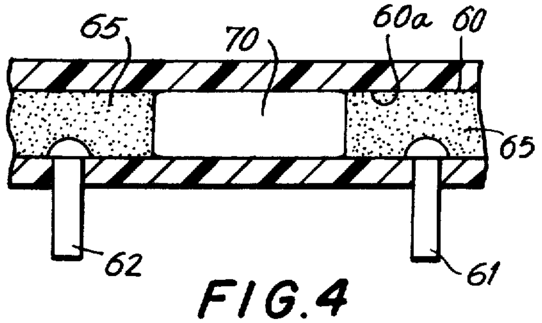
FIG. 4 is an enlarged sectional view of the bubble detector depicted in FIG. 3 showing the presence of a bubble.

Referring now to FIG. 4, it is noted that capillary tube 60 is preferably a thin cylinder which is made of a hydrophobic material such as polyethylene and which has a smooth inner wall 60*a*. Thus, capillary tube 60 will have a bad wetting property with liquid ink 65. With this construction as shown in FIG. 4, a bubble 70, which has a diameter as large as the inside diameter of capillary tubes 60, has a cylindrical shape in capillary tube 60 so that a space in which no ink 65 is present between electrodes 61 and 62 is established by bubble 70 which increases the resistance between electrode 61 and 62 to an infinite value. Since the space defined by bubble 70 is held under a highly stable condition by the capillary action between ink 55 and capillary tube 60, it is barely influenced by the action of gravity so that bubble 70 can be detected at any given orientation of capillary tube 60.

The condition that inner wall 60*a* of capillary tube 60 has a "bad wetting property" with liquid ink 65 is represented as:

$$S(\text{selling coefficient}) = \gamma_s - (\gamma_{sl} + \gamma_l) < 0,$$

where, $\gamma_s$ = surface tension of solid, $\gamma_{sl}$ = interfacial tension between solid and liquid, and $\gamma_l$ = surface tension of liquid.

This means that the critical surface tension $\gamma_c$ of the material used for inner wall 60*a* of capillary tube 60 is smaller than the surface tension $\gamma_l$ of ink 55. For example, under the condition where $\gamma_c < \gamma_l$, polymeric materials, including resins such as polyethylene, polystyrene, polypropylene, fluoroplastics, silicone resins, polysulfones, ABS resin, acrylic resin, polyvinylidene chloride, polyvinyl chloride and polyvinyl alcohol, or paraffin, etc., can be used for inner wall 60*a* of capillary tube 60 in order to provide the required characteristics thereto.

It is also necessary to use a material suitable for the characteristics of ink where different inks are used. In the case of ink in which the surface tension $\gamma_l$ is reduced to about 35 dyn/cm by adding a surface active agent into the ink to improve the quick-drying of the ink on a recording medium, fluoroplastic, silicone resin, polypropylene or the like may be used for the capillary tube. And, where an ink deteriorates due to alkalinity, a wetting agent may be added to the ink and polyethylene, polypropylene, polyvinyl chloride, nylon, fluoroplastic, polysulfone, ABS resin or the like, which have high corrosion resistance, are utilized for the capillary tube. Should ink evaporation be a problem, polyvinylidene chloride may be used.

An air bubble may form at a position closer to print head 51 than electrode 62 of FIG. 3. Such a bubble may be so small that it cannot be detected in capillary tube 60 or the bubble may be formed at end 57*b* of connector 57 when the connection between connecting member 57 and rubber plug 59 is renewed for replacement of ink cartridge 58 after the ink in an old ink cartridge has been consumed. Such a bubble will be blocked by porous member 54 so that it is accumulated in air trapping chamber 55. Since air trapping chamber 55 is provided with ink guide passages 56, it is possible to prevent the bubble from passing through porous member 54 and reaching print head 51 to ensure that the ink supply is not interrupted and to make the printing operation possible at any given orientation of the printer.

Reference is now made to FIG. 5 in order to describe the construction of air trapping chamber 55 depicted in FIG. 3. Air trapping chamber 55 includes a plurality of ink guide passages 56 formed as grooves in the walls of chamber 55 so as to guide ink from connecting member 57 into porous member 54 by capillary action. Each ink guide passage 56 is a groove which is sectionally sized to have a depth and width of about 0.2 mm. As an alternative, the inner surface wall 55a of chamber 55 can be treated with a surface treatment so as to provide it with an excellent wetting property with respect to ink 65 or a bundle of fibers can be arranged in air trapping chamber 55, extending longitudinally thereof.

Figure 6:
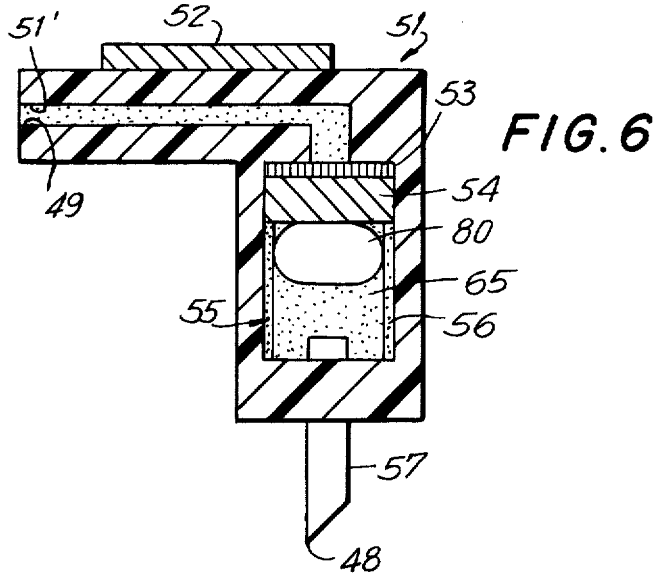
FIG. 6 is an enlarged sectional view of the print head depicted in FIG. 3.

As depicted in FIG. 6, even if a bubble 80 in air trapping chamber 55 grows to a large size and if the printing operation is performed at the worst position as depicted in FIG. 6, ink 65 can still reach porous member 54 by means of the capillary action of ink guide passages 56. It is possible to prevent bubble 80 from passing through porous member 54 and hence the ink supply from being interrupted thereby to perform the printing operation.

As is readily understood from the embodiment thus far described, since there is provided an air trapping chamber 55 which includes ink guide passages 56 which are capable of feeding the ink to the ink jet at any given position of the printer and since there are provided both capillary tube 60 and electrodes 61 and 62 situated therein which can detect the introduction of a bubble having a larger size than a certain level at any given position, a bubble can be prevented from slipping into print head 51 during the normal printing operation and even after the ink is consumed so that the ink-on-demand type ink jet can be applied to a small-size portable printer such as a hand-held calculator or the like by utilizing the present invention.

The applicability and acceptability of the present invention for use in a portable type printer can be increased by selecting the material and shape of porous member 63 such that it can establish a vacuum which is weaker than the capillary pressure of nozzle 49 and which can prevent ink 65 from flowing out of nozzle 49 at any given orientation thereof. A construction in which air inlet 64 is made as thin and long as possible, is advantageous for preventing the ink from being easily and quickly evaporated.

Additionally, there are several types of mechanisms which will be described hereinafter which establish a vacuum in any orientation of the printer without the use of porous member 63. One of these, in which the present invention is applied to an ink cartridge for establishing a vacuum by means of the spring force of an elastic member will now be described with reference to FIG. 7.

An ink bag 71 made of a laminated film of polyethylene and polyvinylidene chloride is suitably coupled to capillary tube 60. An elastic member 73 is provided within ink bag 71 and imparts an outward force on ink bag 71 from the inside. As aforenoted, ink bag 71 is suitably coupled to capillary tube 60 which has electrodes 61 and 62 disposed therein in spaced relation. Elastic member 73 provides a spring force which establishes a negative vacuum for the ink jet printer to suck ink from ink bag 71.

Figure 7:
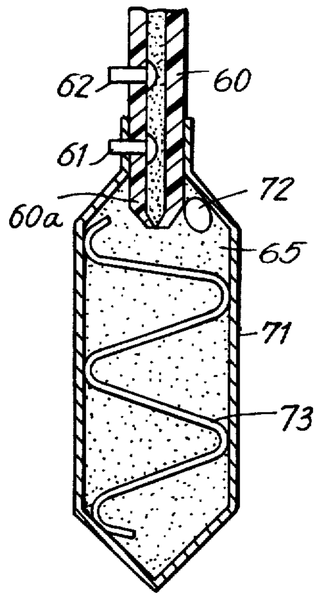
FIG. 7 is a sectional schematic view depicting an alternative embodiment of the ink supply and bubble detector of the present invention.
Figure 8:
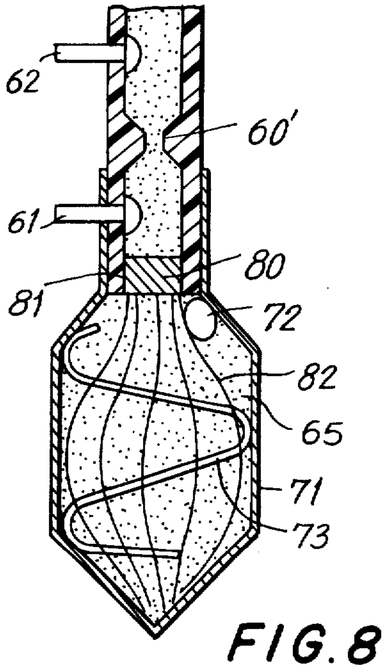
FIG. 8 is a sectional schematic view of another embodiment of the ink supply and bubble detector of the present invention.

A bubble 72 is provided in ink bag 71 in order to allow for detection of ink consumption. In order that bubble 72 not flow into capillary tube 60 until full consumption of the ink, the inlet portion 60a of capillary tube 60 protrudes into ink bag 71, as depicted in FIG. 7. Alternatively, a bubble flow preventing mechanism may be provided as shown in FIG. 8. Bubble 72 will flow into capillary tube 60 only when the ink in ink bag 71 has been used up, at which time bubble 72 will flow into capillary tube 60 between electrodes 61 and 62 to break the resistive connection therebetween. As an alternate, in order that bubble 72 not flow into capillary tube 60 before full ink consumption, a means such as porous member 54 or an air trapping chamber 55 with ink guide passages 56, which has been described above with reference to FIG. 3, has to be provided downstream of capillary tube 60. However, an advantage of the embodiment depicted in FIG. 7, is that, even if a bubble should be formed in print head 51, that bubble can be discharged out of the printing head together with ink by squeezing ink bag 71 from the outside.

If an insulating liquid, which does not react with ink 65, such as silicone oil or the like, is used in place of air bubble 72, entrainment of the air from the bubble is avoided and the ink remains degasified. Air dissolved in the ink can form bubbles due to a temperature change or the like.

Ink consumption is finally determined by the detection of gas. Even if ink bag 71 is made of a film which relatively allows gas to permeate therethrough, such as polyethylene, it is possible to prevent such gas from flowing into the print head of the ink jet printer. An example of a bubble flow preventing means of the type mentioned above is depicted in FIG. 8. In addition to the construction depicted in FIG. 7, a porous member 80 having an excellent wetting property with the ink 65 is provided in an inlet port 81 from which fibers 82 extend. With this construction, a bubble 72 is restrained from passing through porous member 80 so that it cannot flow into capillary tube 60' before ink 65 in ink bag 71 is exhausted. Fibers 82 act in part to prevent porous member 80 from being surrounded, at the position depicted in FIG. 8, by bubble 72 in case bubble 72 is large, until such time as bubble 72 passes through porous member 80. Fibers 82 also allow ink 65 to flow into capillary tube 60' ahead of bubble 72 at least as long as ink 65 is present. Fibers 82 can be replaced by forming ink bag 71 with a groove having a capillary action toward porous member 80. It is also possible to enhance the wetting property of the inside of ink bag 71 so that ink 65 may reach porous member 80 at any orientation of the device. In the embodiment depicted in FIG. 8, a bubble can similarly be discharged together with the ink by squeezing the ink bag from the outside.

Since, in the respective embodiments thus far described, a bubble formed at a closer position to nozzle 49 than porous member 54 makes the printing operation impossible, it is desirable to position porous member 54 as close to nozzle 49 as possible so that it is advantageous to make print head 51 and air trapping chamber 55 intergral as depicted in FIG. 3. Moreover, although print head 51 is described above as being injection molded from plastic, it is also possible to plate the print head 51 with a metal to supress the evaporation of ink and the formation of air bubbles. If, on the other hand, print head 51 is made of glass or metal, little air flows directly into print head 51 from the outside thereof.

Although in the embodiment depicted in FIG. 3 there is no electrical connection depicted from electrodes 61 and 62 to a detecting circuit, such a detecting circuit could be easily constructed by those versed in the art. See for example U.S. Pat. No. 4,202,267. A mechanism could be constructed so that electrodes 61 and 62 are connected to a detecting circuit simultaneously as ink cartridge 58 is positioned in the printer.

It would be possible to connect a temperature characteristic compensating circuit to the detecting circuit to improve the instability of the detecting circuit due to a temperature change. It would also be possible to provide a third electrode in capillary tube 60 so that electrodes 61 and 62 together with the third electrode would constitute a bridge circuit to increase the detecting stability of the detecting circuit. However, the ink supply system depicted in FIG. 3 and described herein provides a substantial benefit over the prior art detecting methods since the change in the resistance in accordance with the existence of a bubble is substantially larger than the change in resistance due to a mere difference in quantity of ink so that sufficient leeway is provided in the aspect of the temperature characteristic.

Since the ink is subjected to electrolysis during resistance detection through electrode 61 and 62 if a D.C. current is applied, the idea of detecting the resistance by the use of an A.C. current is disclosed in the aforementioned U.S. Pat. No. 4,202,267. Since, however, that idea complicates the circuit construction, the sampling detection is performed in the present invention in each printing operation of several lines with the use of very short D.C. pulses of several $\mu s$ to several ms so that stable detection, free from the adverse effects such as electrolysis, is easily performed.

Also, a small bubble which would have no significant effect can be left undetected by selecting the diameter of capillary tube 60 to a suitable value, for example, between 0.3 and 1 mm. In accordance with this, it is possible to eliminate the drawback that the sensitivity of the bubble detection is so refined as to require frequent unnecessary replacement of the ink cartridge. It is further possible that only a portion of tube 60' between the electrodes 61 and 62 is formed into a short capillary region, as depicted in FIG. 8, in order to reduce the passage resistance of the capillary tube. In the embodiment depicted in FIG. 3, it is possible that the same member is commonly used as filter 53 and porous member 54 or that the connecting needle 57 is commonly used as the electrode with either electrode 61 or 62. Moreover, it would be possible to use a bundle of fibers as porous member 54.

As a modification of the ink guide passages 56 depicted in FIG. 5, it is possible to make air trapping chamber 55 cylindrical and serrate the inner surface **55*a* thereof as shown in FIG. 9A to provide a plurality of teeth 90 which provide the required capillary action. Alternatively, a hydrophilic member 92 could be arranged on the inner wall 55*a* of air trapping chamber 55 as depicted in FIG. 9B. Finally, as depicted in FIG. 9C, a number of fibers 94 can be provided in air trapping chamber 55** to act as the ink guide passage.

Since the function of ink guide passages 56 (FIG. 5) is interrupted if air trapping chamber 55 is completely filled up with a bubble, it is necessary to reduce the possibility of the introduction of a bubble into the air trapping chamber to a minimum. Referring now to FIG. 10, the largest air bubble that flows into air trapping chamber 55 is the air 100 which remains upon replacement of ink cartridge 58 due to the meniscus formed at the second end **57*b* of connector 57**.

In order to prevent this, it is advisable to provide in connector 57 either member 101 as depicted in FIG. 11A or member 102 as depicted as FIG. 11B. Alternatively, the second end **57*b* of connector 57 can be reduced as depicted in FIG. 11C. As another alternative, the inside diameter of connecting member 57** can be reduced to such an extent as to exert no adverse effect upon the printing operation. By providing these counter measures, it is possible to sufficiently preserve the capicity of the air trapping chamber under the usual use conditions.

Referring now to FIG. 12, another embodiment to which the present invention is applied, will be described. A print head 171 includes a plurality of nozzles 172. A nozzle cover 173 is provided to cover nozzles 172. A conduit 170 connects an ink tank 175 with the plurality of nozzles 172. A pump 174 pumps the liquid ink 65 from ink tank 175 through conduit 170. For purposes of description, a bubble 176 is illustrated in conduit 170.

The ink 65 is projected, during normal printing operation, from the plurality of nozzles 172 with cover 173 being removed. If a bubble 176 is formed and reaches capillary tube 60, the change in the resistance is detected by means of electrodes 61 and 62. As soon as or after the necessary printing operation is completed, cover 173 closes nozzles 172 and pump 174 is driven for a predetermined time period. By driving pump 174, the ink is caused to flow in the direction of arrow A so that bubble 176 is carried to a place where no influence is exerted upon print head 171 until it is returned into the ink tank 175 with the ink. Thus, if any bubble exists in the conduit 170, it can automatically be removed so that interference with the printing operation due to the existence of the bubble in the conduit can be prevented.

Figure 13:
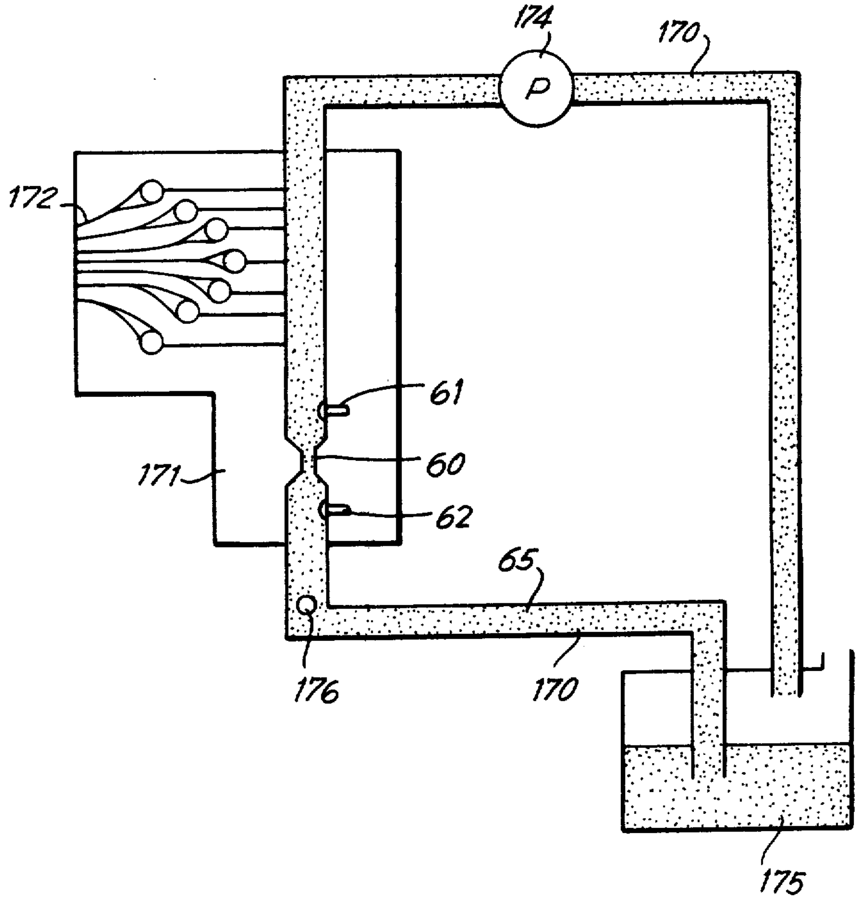
FIG. 13 is a schematic diagram of another embodiment of the ink supply system of FIG. 12.

In this embodiment, although capillary tube 60 is provided separately of print head 171, it would be possible either to provide capillary tube in print head 171 or to discharge the ink from nozzles 172 to the outside together with the bubble 176 instead of returning ink 65 to ink tank 175 by the action of pump 174. According to the embodiment in FIG. 13, the bubble detecting means (capillary tube 60 and electrodes 61 and 62) is formed in print head 171, thereby the distance between the print head and the bubble detecting means is shortened and bubbles arisen between the bubble detecting means and the ink tank are certainly detected by the bubble detecting means. As a result of that bubbles are prevented from entering into the pressure chamber. Moreover, as the capillary tube is formed with the nozzles and the pressure chamber in the print head, it is accomplished at low cost.

According to the present invention, it is possible to prevent any air bubble from flowing into the print head of an ink jet printer by means of both an air trapping chamber, which includes an ink guide passageway and a porous member so that it can trap the bubble at any orientation of the printer, and a bubble detecting mechanism which includes a capillary tube and electrode configuration which can detect the existence of a bubble without fail at any given orientation of the printer. The detector can also detect when the ink has been exhausted. Thus, it is possible to provide a small-size portable ink-on-demand printer which is highly reliable even during the normal printing operation or upon the ink consumption.

In accordance with the present invention, remarkably highly effective counter-measures to the production of bubbles can be obtained by combining the air trapping chamber and the bubble detecting mechanism. Many advantages such as improvement in the degree of freedom in the design or in the reliability of the device even if the respective functions are independently applied to a fixed type printer for example, are obtained. As can be clearly seen, since there are arranged in the ink passage both electrodes and the capillary tube which extends at least partially between the electrodes and which has such a smooth inner wall as has a bad wetting property with the ink and as has a generally circular cross section, it is possible to provide a bubble detector in which the change in the resistance to be detected is so large that reliable detection can be performed at any given position of the printer and the sensitivity to the size of the bubble can be selected. Thus, the present invention can be widely applied not only to portable small-size printers but also to a variety of printers such as ink jet printers, a plotter, a facsimile or a copier. On the other hand, the present invention can be used not only for the detection of bubbles or the exhaustion of the ink supply, but also for the detection of a fluid having such multiple components as cannot be mutually dissolved.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An ink jet printer for printing characters and symbols on a recording medium by selectively projecting ink from an ink jet nozzle on a print head toward said recording medium, comprising ink storage means for holding a supply of ink, conduit means connecting said ink storage means to said print head so that ink can be supplied to said nozzle from said ink storage means through said conduit means, and air trapping means disposed along the path of flow of said ink through said conduit means, said air trapping means including a wall which defines an inner chamber, said air trapping means further including first porous means for preventing air bubbles in said ink from flowing into said nozzle and fluid passage means formed in said inner chamber for creating a capillary force which causes said ink to flow to said nozzle through said first porous means past air bubbles in said chamber, said chamber collecting and holding air bubbles prevented from passing into said nozzle by said first porous means.

2. The printer, as claimed in claim 1, wherein said porous means has an excellent wetting property with said ink.

3. The printer, as claimed in claim 1, wherein said first porous means is formed from a material having an excellent wetting property with said ink.

4. The printer, as claimed in claim 3, wherein said material is a polyvinyl formal resin.

5. The printer, as claimed in claim 1, wherein said print head includes a piezoelectric means mounted thereon for energizing said print head.

6. The printer, as claimed in claim 5, wherein said print head further includes a filter means disposed along said conduit means in the path of said ink for preventing dust from entering said nozzle.

7. The printer, as claimed in claim 1, wherein said fluid passage means includes a plurality of grooves formed on said wall of said air trapping means.

8. The printer, as claimed in claim 7, wherein said grooves are rectangular in cross-section.

9. The printer, as claimed in claim 7, wherein said air trapping means has a plurality of inner surfaces extending in the direction of ink flow, each said inner surface having at least one said groove formed thereon.

10. The printer, as claimed in claim 2, wherein said first porous means includes a bundle of fibers.

11. The printer, as claimed in claim 5, wherein said air trapping means is provided in said print head.

12. The printer, as claimed in claim 1, wherein said fluid passage means includes serrations on said wall extending in the direction of ink flow through said chamber to said first porous means.

13. The printer, as claimed in claim 12, wherein said air trapping means is cylindrical in shape.

14. An ink jet printer for printing characters and symbols on a recording medium by selectively projecting ink from an ink jet nozzle on a print head toward said recording medium, comprising ink storage means for holding a supply of ink, conduit means connecting said ink storage means to said print head so that ink can be supplied to said nozzle from said ink storage means through said conduit means, and air trapping means disposed along the path of flow of said ink through said conduit means, said air trapping means including a wall which defines an inner chamber, said air trapping means further including first porous means for preventing air bubbles in said ink from flowing into said nozzle and fluid passage means formed in said inner chamber for creating a capillary force which causes said ink to flow to said nozzle through said first porous means past air bubbles in said chamber, said fluid passage means including a hydrophilic means on said wall extending through said chamber to said first porous means, said chamber collecting and holding air bubbles prevented from passing into said nozzle by said first porous means.

15. The printer, as claimed in claim 1, wherein said fluid passage means includes a plurality of fibers which extend through said chamber in the direction of ink flow to said porous means.

16. The printer, as claimed in claim 1 or 4, further comprising ink cartridge means which supports said ink storage means, said ink cartridge means including a second porous means for holding said ink.

17. The printer, as claimed in claim 16, wherein said ink cartridge means includes an air vent means.

18. The printer, as claimed in claim 16, wherein said print head includes hollow needle means for connecting said ink cartridge means to said print head.

19. The printer, as claimed in claim 18, wherein said ink cartridge means is disposable.

20. The printer, as claimed in claim 19, wherein said ink cartridge means includes bubble detecting means in said conduit means for detecting the presence of a bubble in said ink cartridge means.

21. The printer, as claimed in claim 20, wherein said bubble detecting means includes at least two spaced electrodes in said conduit means positioned for contact by ink in said conduit means.

22. The printer, as claimed in claim 21, wherein said conduit means in said ink cartridge means includes a capillary means, said at least two electrodes being positioned with at least a portion of said capillary means therebetween.

23. The printer, as claimed in claim 22, wherein said bubble detecting means also detects when said supply of ink has been exhausted by detecting the presence of air in said conduit means.

24. The printer, as claimed in claim 18, wherein said hollow needle means includes a sharp point which is beveled.

25. The printer, as claimed in claim 24, wherein said needle means includes means for inhibiting the formation of an air bubble when said ink cartridge means is replaced.

26. The printer, as claimed in claim 25, wherein said means for inhibiting is a member extending radially across the hollow portion of said needle means and dividing at least a region thereof.

27. The printer, as claimed in claim 26, wherein said means for inhibiting is a rod in the hollow portion of said needle means which is essentially concentric with said needle means.

28. The printer, as claimed in claim 1 or 14, wherein said ink storage means includes a flexible wall defining an ink bag in which said ink is stored, said ink storage means including elastic means in said ink bag for imparting an outward force on said flexible wall.

29. The printer, as claimed in claim 28, wherein said conduit means projects from an opening in said ink bag through which said ink flows and into the interior of said ink bag.

30. The printer, as claimed in claim 28, wherein said conduit means is coupled to an exit opening in said ink bag and includes bubble flow preventing means positioned therein in the region of the exit opening.

31. The printer, as claimed in claim 30, wherein said bubble flow preventing means includes third porous means having said excellent wetting property with said ink.

32. The printer, as claimed in claim 31, wherein said bubble flow preventing means further includes fibers which extend into said ink bag from said third porous means.

33. An ink jet printer for printing characters and symbols on a recording medium by selectively projecting ink from an ink jet nozzle on a print head toward said recording medium, comprising ink storage means for holding a supply of ink, conduit means connecting said ink storage means to said nozzle through which ink is supplied to said nozzle, and bubble detecting means disposed along the path of flow of said ink for detecting bubbles in said ink, said bubble detecting means including at least two electrodes in said conduit means spaced along the path of flow of said ink and an ink passage means disposed intermediate said two electrodes, said ink passage means including a wall defining a capillary means, said wall having a bad wetting property with said ink, said bubble detecting means detecting only air bubbles having an inside diameter at least as large as the diameter of said capillary means.

34. The printer, as claimed in claim 33, wherein said wall is smooth on the inner surface thereof.

35. The printer, as claimed in claim 34, wherein said capillary means has a generally circular cross-section.

36. The printer, as claimed in claim 35, wherein the inner surface of said wall is made of a material having a critical surface tension which is less than the surface tension of said ink.

37. The printer, as claimed in claim 36, wherein said material is a polymeric material.

38. The printer, as claimed in claim 37, wherein said polymeric material is selected from the group consisting of polyethylene, polystyrene, polypropylene, fluoroplastics, silicone resins, polysulfones, ABS resin, acrylic resin, polyvinylidene chloride, polyvinyl chloride, polyvinyl alcohol and nylon.

39. The printer, as claimed in claim 36, wherein said material is paraffin.

40. The printer, as claimed in claim 36, further comprising ink cartridge means which supports said ink storage means, said bubble detecting means being disposed in said ink cartridge means.

41. The printer, as claimed in claim 36, further comprising air trapping means disposed along the path of flow of said ink through said conduit means, said air trapping means including a surface which defines an inner chamber, said air trapping means further including porous means for preventing air bubbles in said ink from flowing into said nozzle and fluid passage means formed in said inner chamber through which said ink can flow to said nozzle, said chamber collecting and holding air bubbles prevented from passing into said nozzle by said porous means.

42. The printer, as claimed in claim 41, wherein said air trapping means is disposed closer to said nozzle than said bubble detecting means.

43. The printer, as claimed in claim 42, further comprising ink cartridge means which supports said ink storage means, said air trapping means being disposed on said print head and said bubble detecting means being provided in said ink cartridge means.

44. The printer, as claimed in claim 33, wherein said bubble detecting means is disposed in said print head.

45. The printer, as claimed in claim 33, wherein when said bubble detecting means detects bubbles in ink, the bubbles are discharged with the ink from said nozzle.

* * * * *